UNITED STATES PATENT OFFICE.

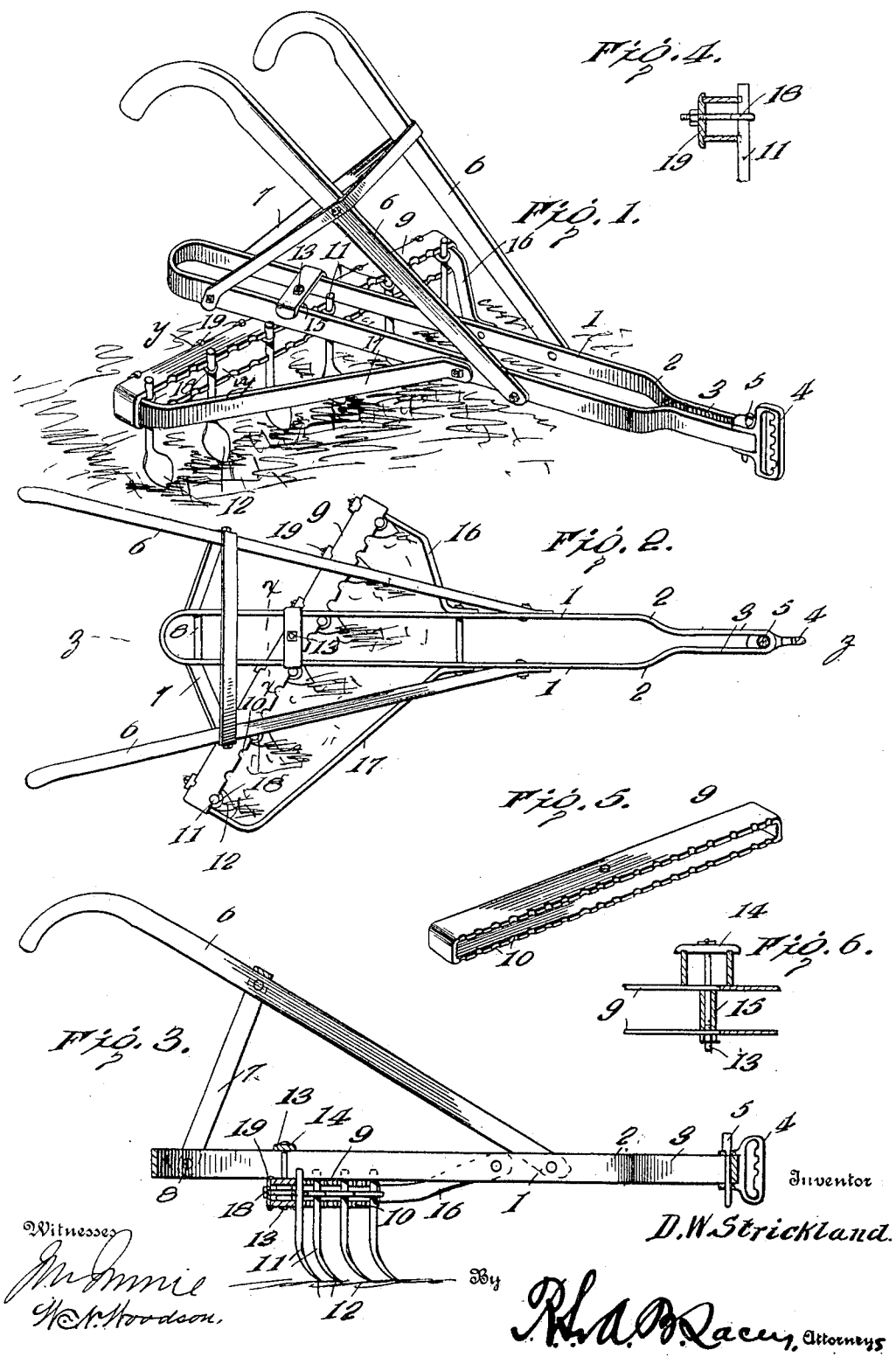

DE WITT W. STRICKLAND, OF MAGNOLIA, MISSISSIPPI.

CULTIVATOR.

No. 818,923.　　　Specification of Letters Patent.　　　Patented April 24, 1906.

Application filed May 19, 1905. Serial No. 261,244.

*To all whom it may concern:*

Be it known that I, DE WITT W. STRICKLAND, a citizen of the United States, residing at Magnolia, in the county of Pike and State of Mississippi, have invented certain new and useful Improvements in Cultivators, of which the following is a specification.

This invention provides an implement for tilling the soil which while primarily designed for use as a cultivator may be advantageously employed in the capacity of a harrow for pulverizing and leveling the ground preparatory to planting.

The invention contemplates a beam of novel formation, peculiar connections between the toothed bar and the beam, and an improved general structure whereby lightness of structure, combined with strength, durability, efficiency, and ease of manipulation of the implement, are attained.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a perspective view of a cultivator embodying the invention. Fig. 2 is a top plan view thereof. Fig. 3 is a vertical longitudinal section on the line $z\ z$ of Fig. 2. Fig. 4 is a transverse section of the toothed bar on the line $y\ y$ of Fig. 1, showing the parts on a larger scale. Fig. 5 is a perspective view of the toothed bar having the teeth omitted. Fig. 6 is a transverse section of the beam on the line $x\ x$ of Fig. 2 in connection with the adjacent portion of the toothed bar, the parts being shown on a larger scale.

Corresponding and like parts are referred to in the following description and indicated in all the views of the drawings by the same reference characters.

The beam is straight and comprises similar members 1, having an offset 2 near their front ends to bring the parts 3 close together, so as to receive the clevis fastening, tooth, or other desired part. The beam is preferably constructed of a metal bar bent upon itself into the form substantially as shown, the end portions of the bar being welded or otherwise joined to form, in effect, an integral structure. A beam constructed in this manner is comparatively light and capable of resisting considerable wear and strain and may be easily handled.

The clevis 4 may be of any usual construction and is attached to the front end of the beam by means of a bolt or other fastening 5, the latter passing through rearwardly-extended lugs of the clevis and through the space formed at the front end of the beam at the fold of the bar. The handle-bars 6 are bolted or otherwise fastened at their lower ends to the side bars of the beam and are supported by means of a brace-frame 7 of approximately triangular form, said frame being formed of a bar made fast to the handle-bars and having its end portions bent downwardly and inwardly and attached to the rear portion of the beam by means of a fastening 8.

The toothed bar 9 comprises companion members disposed in parallel relation and spaced apart a predetermined distance and connected at their ends. A series of notches 10 are formed in the front edges of the members to form seats in which the shanks 11 of the cultivator-shovels 12 are fitted. The notches in the front edge of the upper member correspond in position and number with the notches in the front edge of the lower member. Hence corresponding notches are in vertical alinement. The bar 9 is attached to the beam about at a central point by means of a bolt or like fastening 13 passed through vertically-alined openings in the members of the bar and through a clamp-plate 14, spanning the members 1 of the beam and having grooves in its end portions to receive the upper edge of the members 1. A sleeve 15, mounted upon the bolt 13, is arranged between the members of the bar 9 to hold them apart and insure secure clamping of the bar and beam when the bolt or like fastening 13 is tightened. A brace 16 connects one end of the toothed bar 9 with a side of the beam, and a companion brace 17 connects the opposite end of the bar 9 with the other side of the beam. The braces 16 and 17 supplement the action of the fastening 13 in securing the toothed bar to the beam. The toothed bar 9 may be arranged in any angular position with reference to the beam, and, as shown, it has an oblique disposition, this being the most general position. The shovels 12 or like earth-treating devices are provided with round shanks 11, which are fitted into the half-round notches or seats 10 of the toothed bar, the rounded form of the shanks and their seats admitting of readily turning the shovels to any desired angular position, according to the nature of the work or the peculiarities of the soil. The shovels or teeth may be adjusted to any position in the length of the toothed bar, and any number may be provided to insure pulverizing the soil or cultivating the same to any desired extent. The teeth or shovels are secured in position by suitable fastenings, which may consist of hooks or eyebolts 18 and clamp-plates 19, the latter spanning the members of the bar 9 and notched or grooved near their ends to receive the rear edges of said members to prevent slipping and obviating movement of the members either toward or from each other.

Having thus described the invention, what is claimed as new is—

1. In combination, a bar comprising companion members arranged in parallel relation and spaced apart and having alined notches in corresponding edges, cultivator-shovels having their shanks seated in said notches and adjustable along the bar, fastenings engaging the shanks of the cultivator-shovels at points opposite the space formed between the companion members thereof and passed between the latter, and clamp-plates engaging the edges of the bar members opposite to the toothed edges and serving to secure the cultivator-shovels to the bar in an adjusted position.

2. In a cultivator, the combination of a beam comprising similar members transversely spaced, a bar angularly disposed with reference to the beam and comprising spaced members having alined notches in corresponding edges, cultivator-shovels having their shanks seated in said notches, fastenings passed between the members of the bar and serving to secure the cultivator-shovels thereto in an adjusted position, means for connecting the beam and bar, the same comprising a clamp-plate spanning the members of the beam and grooved near its ends to receive the edge portions thereof, a bolt passed through corresponding openings in the clamp-plate and in the members of the toothed bar, and a spacing-sleeve mounted upon the bolt and coming between the members of the bar.

In testimony whereof I affix my signature in presence of two witnesses.

DE WITT W. STRICKLAND. [L. S.]

Witnesses:
M. M. HART,
HOMER HART.